US008913840B2

United States Patent
Yoshimura (10) Patent No.: US 8,913,840 B2
(45) Date of Patent: Dec. 16, 2014

(54) IRREVERSIBLE COMPRESSION APPARATUS, AND METHOD AND PROGRAM FOR CONTROLLING OPERATION OF SAME

(75) Inventor: Natsuko Yoshimura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 155 days.

(21) Appl. No.: 13/592,328

(22) Filed: Aug. 22, 2012

(65) Prior Publication Data

US 2013/0064461 A1    Mar. 14, 2013

(30) Foreign Application Priority Data

Sep. 14, 2011    (JP) .................................. 2011-200339

(51) Int. Cl.
| | |
|---|---|
| *G06K 9/40* | (2006.01) |
| *H04N 19/192* | (2014.01) |
| *H04N 19/15* | (2014.01) |
| *H04N 19/196* | (2014.01) |
| *G06T 9/00* | (2006.01) |

(52) U.S. Cl.
CPC ... *H04N 19/00369* (2013.01); *H04N 19/00357* (2013.01); *H04N 19/00187* (2013.01); *G06T 9/00* (2013.01)
USPC .......................................... 382/232; 382/233

(58) Field of Classification Search
CPC .............. G06T 9/10; H04N 19/00369; H04N 19/00357; H04N 19/00187; H04N 7/50
USPC .................................................. 382/232–233
See application file for complete search history.

(56) References Cited

U.S. PATENT DOCUMENTS

| 5,991,458 A | 11/1999 | Kunitake et al. |
| 6,563,517 B1 | 5/2003 | Bhagwat et al. |
| 7,536,054 B2 * | 5/2009 | Banno et al. .................. 382/232 |
| 7,747,085 B2 * | 6/2010 | Kostrzewski et al. ........ 382/232 |
| 2004/0114810 A1 * | 6/2004 | Boliek et al. .................. 382/232 |
| 2005/0018908 A1 * | 1/2005 | Johannesson et al. ........ 382/232 |

FOREIGN PATENT DOCUMENTS

| JP | 5-176173 (A) | 7/1993 |
| JP | 10-075369 (A) | 3/1998 |
| JP | 2000-175048 (A) | 6/2000 |
| JP | 2000-222332 (A) | 8/2000 |
| JP | 2006-060343 (A) | 3/2006 |
| JP | 2010-206244 (A) | 9/2010 |

OTHER PUBLICATIONS

Mizutani, et al., "Quality-Oriented Image Coding using an Objective Measure of PSNR", pp. 229-237, Journal of Signal Processing, Research Institute of Signal Processing, vol. 7, No. 3, May 2003.
Horita, et al., "Quality Oriented JPEG Coding for Monochrome Still Picture", The IEICE Transactions, The Institute of Electronics, Information and Communication Engineers, Jan. 15, 2000, vol. J83-B No. 1, pp. 121-127.

* cited by examiner

*Primary Examiner* — Kanjibhai Patel
(74) *Attorney, Agent, or Firm* — McGinn IP Law Group, PLLC (57) ABSTRACT

A compressed image, for which a desired SSIM value is obtained, is acquired when irreversible compression is performed. Specifically, a quadratic curve G2 is defined. Next, a compression ratio P4 is calculated. An image is irreversibly compressed at the compression ratio P4, the compressed image is decoded and an SSIM value S5 is calculated. If the calculated SSIM value S5 is outside an allowable range of the target SSIM value, then the quadratic curve G2 is corrected in such a manner that it will pass through an intersection C4 between the compression ratio P4 and the SSIM value S5, whereby a quadratic curve G3 is obtained.

19 Claims, 8 Drawing Sheets

IRREVERSIBLE COMPRESSION APPARATUS, AND METHOD AND PROGRAM FOR CONTROLLING OPERATION OF SAME

BACKGROUND OF THE INVENTION

1. Field of the Invention

This invention relates to an irreversible compression apparatus and to a method and program for controlling the operation of this apparatus.

2. Description of the Related Art

Irreversible compression allows some dropout of data but features a high compression efficiency. Even when decoded, data that has been compressed irreversibly cannot be restored completely to the data that prevailed prior to compression. If a desired image quality is desired with regard to an irreversibly compressed image, processing is executed as follows: For example, image data representing an original image is irreversibly compressed, the irreversibly compressed image data is decoded, and irreversible compression, decoding and calculation of an image degradation index of the decoded image data are repeated until the image degradation index represents the desired image.

In a transcoding proxy that acts as a relay between a plurality of client devices and a plurality of servers connected via a communication network, there is a technique that enhances the advantage of transcoding, namely how to send a high-quality image to each client device within transmission-delay tolerance (Patent Document 1). First, the network characteristics are analyzed, an estimated value of image transmission time is acquired and a decision is rendered as to whether or not to apply transcoding. If transcoding is carried out, then transcoding parameters for which output image size and a tradeoff between quality and size will be optimized are predicted statistically and adjusted. A tradeoff relating to selection of transcoding parameters can also be converted dynamically by the user.

Further, in order to maintain a prescribed image quality for a decoded image and to realize as high a compression ratio as possible, there is a technique for predicting image quality by measuring such physical quantities as the input image and states of the input and output devices, and controlling image quality using coding parameters that have been adapted to these physical quantities (Patent Document 2).

Furthermore, there is a technique, which is used in an imaging apparatus such as a facsimile machine, for calculating an image degradation index (SSIM: Structural SIMilarity) value in comparatively accurate fashion (Patent Document 3).

Further, there is a coding apparatus for setting and coding a group of coding parameters suitable for a plurality of partial images, (Patent Document 4), a coding apparatus having excellent operability and capable of being fabricated at low cost (Patent Document 5), and a technique for obtaining decoded images of stable quality (Patent Document 6).

[Patent Document 1] Japanese Patent Application Laid-Open No. 2000-222332
[Patent Document 2] Japanese Patent Application Laid-Open No. 10-75369
[Patent Document 3] Japanese Patent Application Laid-Open No. 2010-206244
[Patent Document 4] Japanese Patent Application Laid-Open No. 2006-60343
[Patent Document 5] Japanese Patent Application Laid-Open No. 2000-175048
[Patent Document 6] Japanese Patent Application Laid-Open No. 5-176173

Since irreversible compression, decoding and calculation of the image degradation index often are time consuming, it often takes time to obtain the desired image quality. With the technique described in Patent Document 1, it is difficult to obtain an output image that falls within the desired image quality. Since a subjective image degradation index is utilized in the technique described in Patent Document 2, objectivity is lacking. In addition, since the relationship between image quality and the degradation parameters is not updated, image quality cannot be controlled efficiently. With the technique described in Patent Document 3, a decline in image quality due to compression is not measured from the first. Further, obtaining the desired image quality takes too much time with the techniques described in Patent Documents 4 to 6.

SUMMARY OF THE INVENTION

An object of the present invention is to obtain desired image quality in a comparatively short period of time.

The present invention provides an irreversible compression apparatus for irreversibly compressing image data, comprising: an irreversible compression control device (irreversible compression control means) for controlling the irreversible compression apparatus, based upon a curve representing a relationship between compression ratio of irreversible compression and image quality of image data that has been irreversibly compressed, in such a manner that the image will be irreversibly compressed at a compression ratio that will result in a desired image quality; an image quality calculating device (image quality calculating means) for calculating the image quality of the image data irreversibly compressed under control exercised by the irreversible compression control device; a curve correcting device (curve correcting means) for correcting the curve so as to satisfy a relationship between the compression ratio, which is used in control of the irreversible compression apparatus by the irreversible compression control device, and the image quality calculated by the image quality calculating device (i.e., so as to meet the conditions of the relationship, represent the relationship or pass through the point of intersection of the compression ratio and the image quality); and a control device (control means) for controlling the irreversible compression control device, the image quality calculating device and the curve correcting device in such a manner that control by the irreversible compression control device, calculation of image quality by the image quality calculating device and correction of the curve by the curve correcting device are repeated until the image quality calculated by the image quality calculating device attains the desired image quality.

The present invention also provides an operation control method suited to the irreversible compression apparatus described above. Specifically, the present invention provides a method of controlling operation of an irreversible compression apparatus for irreversibly compressing image data, comprising the steps of: an irreversible compression control device controlling the irreversible compression apparatus, based upon a curve representing a relationship between compression ratio of irreversible compression and image quality of image data that has been irreversibly compressed, in such a manner that the image will be irreversibly compressed at a compression ratio that will result in a desired image quality; an image quality calculating device calculating the image quality of the image data irreversibly compressed under control exercised by the irreversible compression control device; a curve correcting device correcting the curve so as to satisfy a relationship between the compression ratio, which is used in control of the irreversible compression apparatus by the irreversible compression control device, and the image quality calculated by the image quality calculating device; and a control device controlling the irreversible compression control device, the image quality calculating device and the curve correcting device in such a manner that control by the irreversible compression control device, calculation of image quality by the image quality calculating device and correction of the curve by the curve correcting device are repeated until the image quality calculated by the image quality calculating device attains the desired image quality.

The present invention further provides a computer-readable program for implementing the above-described method of controlling operation of an irreversible compression apparatus. It may also be arranged to provide a recording medium on which this program has been stored.

In accordance with the present invention, image data is irreversibly compressed, based upon a curve representing a relationship between the compression ratio of irreversible compression and the image quality of image data that has been irreversibly compressed, in such a manner that a desired image quality is attained, and the image quality of the irreversibly compressed image data is calculated. The curve is corrected so as to satisfy a relationship between the compression ratio, which is used in irreversible compression, and the calculated image quality. Such irreversible compression, calculation of image quality and curve correction are repeated until the calculated image quality attains the desired image quality. Since the image data is irreversibly compressed at a compression ratio that will afford the desired image quality using a curve representing the relationship between the compression ratio of irreversible compression and the image quality of the irreversibly compressed image data, the image data after irreversible compression will take on the desired image quality in a comparatively short period of time. Further, since the curve representing the relationship between the compression ratio of irreversible compression and the image quality of the irreversibly compressed image data is corrected, the image quality of the obtained image data will be close to the desired image quality.

The apparatus may further comprise a curve generating device (curve generating means) for generating the above-mentioned curve from a relationship between image quality of image data obtained when image data has been irreversibly compressed at a desired initial compression ratio, and the initial compression ratio. In this case, by way of example, the irreversible compression control device would control the irreversible compression apparatus, based upon the curve generated by the curve generating device, in such a manner that the image data will be irreversibly compressed at a compression ratio that will result in the desired image quality.

For example, the curve generating device calculates the curve from the relationship between image quality of image data obtained when image data has been irreversibly compressed at a desired initial compression ratio, and the initial compression ratio; a relationship between best image quality of image data after irreversible compression and a compression ratio obtained at the time of the best image quality; and a relationship between worst image quality of image data after irreversible compression and a compression ratio obtained at the time of the worst image quality.

The image quality calculating device may include a decoding device (decoding means) for decoding image data that has been irreversibly compressed under control exercised by the irreversible compression control device. In this case, image quality can be calculated by comparing the image data decoded by the decoding device and image data prior to irreversible compression by the irreversible compression apparatus.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
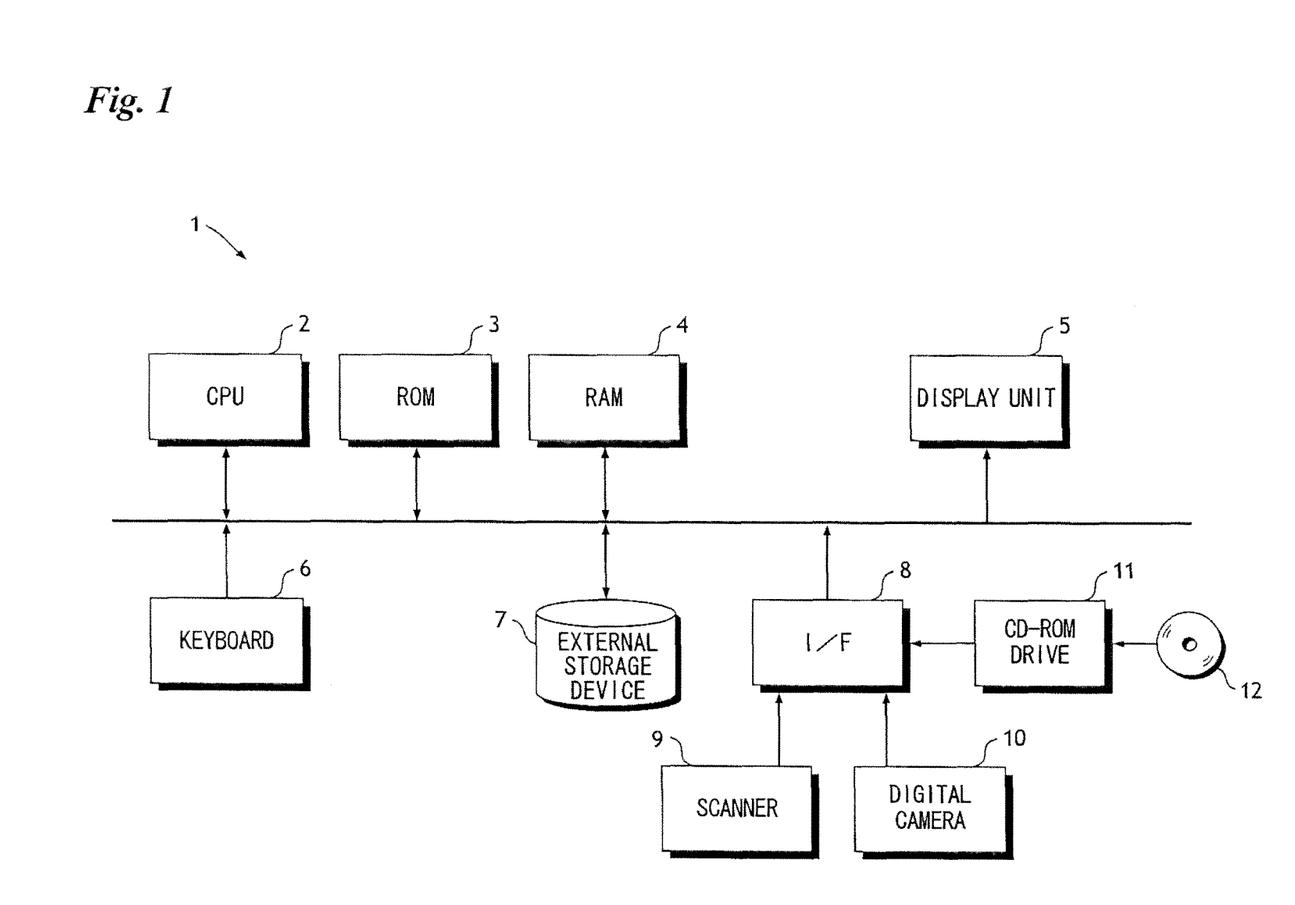
FIG. 1 is a block diagram illustrating the electrical configuration of an irreversible compression apparatus.

FIG. 1 is a block diagram illustrating the electrical configuration of an irreversible compression apparatus 1 according to an embodiment of the present invention.

The irreversible compression apparatus 1 according to the embodiment compresses an image data irreversibly to obtain the image data of desired image quality.

The overall operation of the irreversible compression apparatus 1 is controlled by a CPU 2.

A program for controlling operation (described later) has been stored on a CD-ROM (Compact Disk-Read-Only Memory) 12. When the CD-ROM 12 is loaded in a CD-ROM drive 11, the control program that has been stored on the CD-ROM 12 is read. The read control program is installed in the irreversible compression apparatus 1. Naturally, the control program may be stored on a recording medium other than the CD-ROM 12 or may be pre-installed in the irreversible compression apparatus 1. In a case where the irreversible compression apparatus 1 has been provided with a communication device, it may be arranged so that the control program is transmitted to the irreversible compression apparatus 1 via a network such as the Internet and is received by the irreversible compression apparatus 1.

The irreversible compression apparatus 1 includes a ROM 3 storing prescribed data and the like, a RAM 4, a display unit 5 for displaying images and the like, and a keyboard 6 for inputting commands and the like. An external storage device 7 such as a hard-disk drive has been connected to the irreversible compression apparatus 1. The irreversible compression apparatus 1 further includes an interface 8. Connected to the interface 8 are a scanner 9, a digital camera 10 and the CD-ROM drive 11.

Although image data representing a plurality of images to be irreversibly compressed has been stored in the external storage device 7, it may be arranged so that these items of image data are read from the scanner 9 or digital camera 10.

Figure 2:
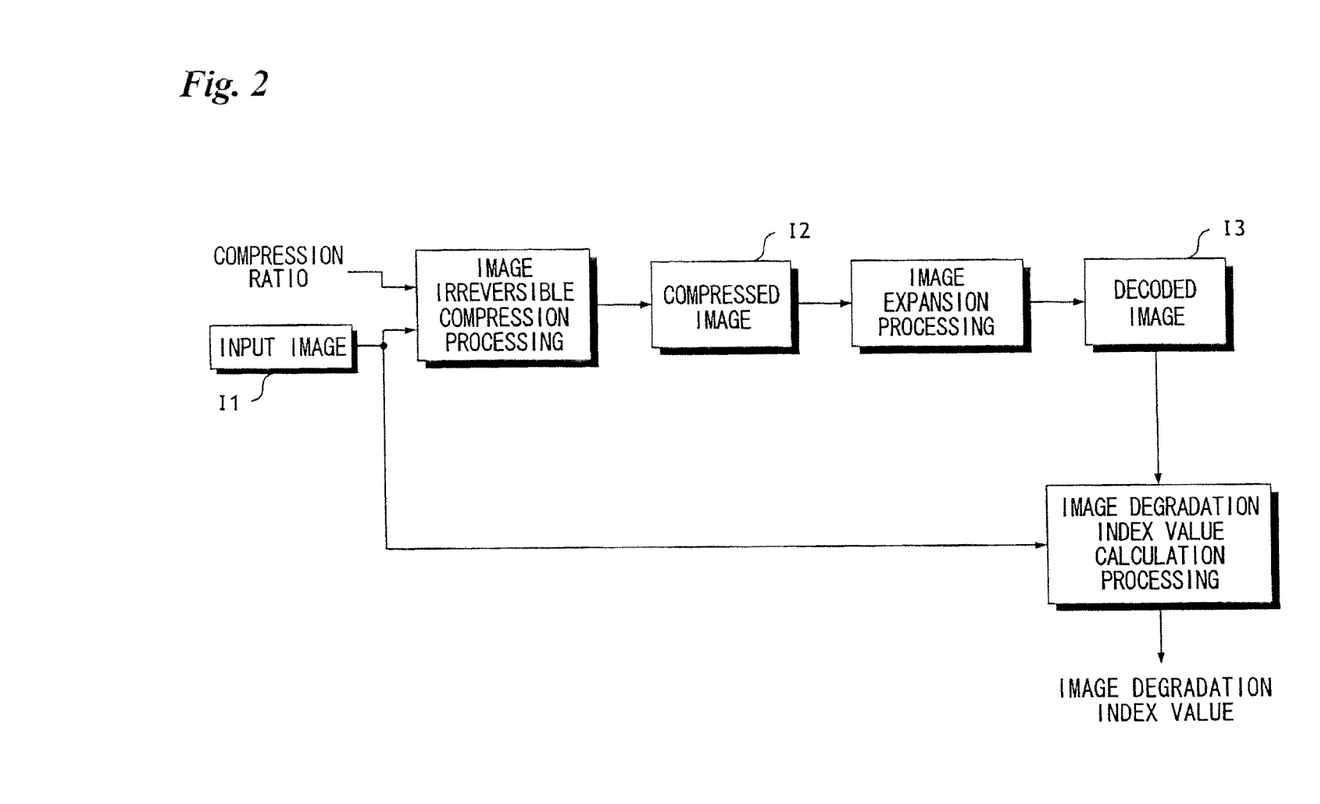
FIG. 2 illustrates processing for calculating the value of an image degradation index.

FIG. 2 illustrates a method of processing for calculating the value of an image degradation index.

In a case where the value of an image degradation index is calculated in irreversible compression, an input image I1 is applied and so is a compression ratio for use when the input image I1 is irreversibly compressed. The input image I1 is irreversibly compressed (coded) at the applied compression ratio, whereupon a compressed image I2 is obtained. A decoded image I3 is obtained by subjecting the obtained compressed image I2 to image expansion processing (decoding). The value of the image degradation index is calculated by executing processing for calculating the value of the image degradation index based upon the decoded image I3 obtained and the input image I1 that prevailed prior to irreversible compression.

Figure 3:
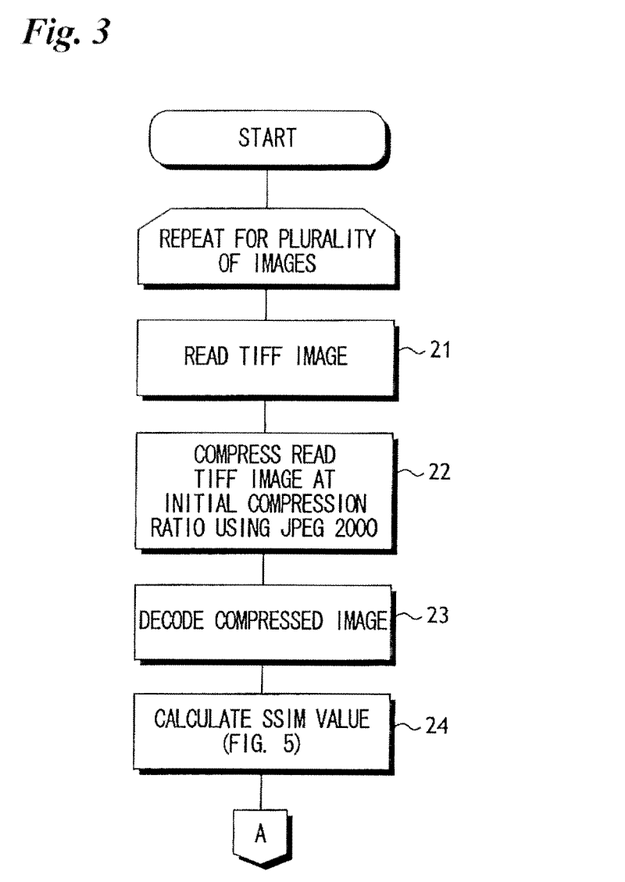
FIGS. 3 and 4 are flowcharts illustrating processing executed by the irreversible compression apparatus.
Figure 4:
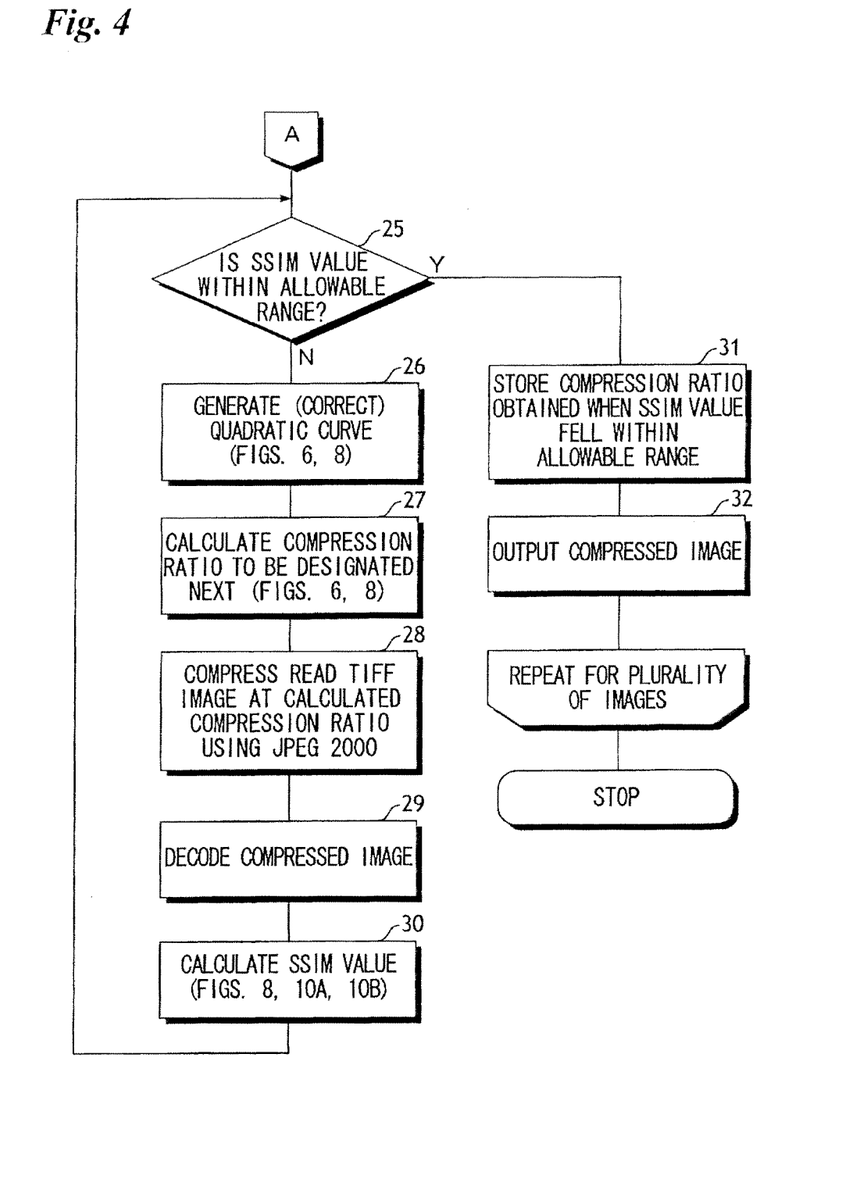

FIGS. 3 and 4 are flowcharts illustrating processing executed by the irreversible compression apparatus 1.

In this embodiment, image data is irreversibly compressed so as to result in a desired SSIM value. (An image degradation index value other than an SSIM value may be used; it will suffice if image quality can be ascertained.) A compression ratio for obtaining an image having the desired SSIM value is found by taking note of the fact that the relationship between compression ratio and SSIM value can be approximated by a quadratic curve.

The processing described below is executed with regard to a plurality of images.

First, a TIFF (Tagged Image File Format) image to be irreversibly compressed is read from the external storage device 7 (step 21 in FIG. 3). It goes without saying that the image to be irreversibly compressed is limited to a TIFF image. The read TIFF image is subjected to compression based upon JPEG (Joint Photographic Experts Group) 2000 at a given initial compression ratio (step 22 in FIG. 3). As long as the compression is irreversible, compression need not be based upon JPEG 2000. The compressed image is decoded in the manner described above (step 23 in FIG. 3) and the SSIM value is calculated (step 24 in FIG. 3).

Figure 5:
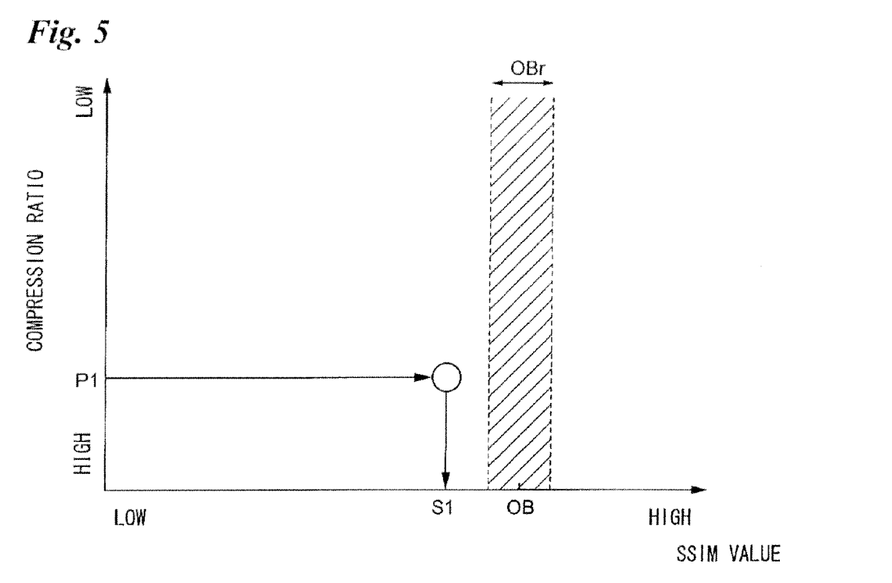
FIGS. 5 to 9 illustrate the relationship between compression ratio and image degradation index value.

FIG. 5 illustrates the relationship between compression ratio and SSIM value.

Assume that it is desired to perform irreversible compression such that the SSIM value of an image after the irreversible compression thereof will be OB. Assume that SSIM values OBr of a zone (indicated by the hatching) in the vicinity of the target SSIM value OB define an allowable range.

Let the given initial compression ratio be a compression ratio P1. Compression based upon JPEG 2000 is applied to the read TIFF image at this initial compression ratio P1 and the SSIM value of the compressed image is calculated as set forth above. Let the calculated SSIM value be S1.

With reference to FIG. 4, assume that the calculated SSIM value has fallen within the allowable range ("YES" at step 25). In such case, the compression ratio that prevailed when the calculated SSIM value fell within the allowable range is stored (step 31). The stored compression ratio is adopted as the initial compression ratio of the next image and processing from step 21 onward in FIG. 3 is repeated. The compressed image is output as by file generation, display and storage in the external storage device 7 (step 32).

Now assume that the calculated SSIM value has not fallen within the allowable range ("NO" at step 25). In this case, a quadratic curve indicating the relationship between the compression ratio and SSIM value is generated (step 26).

Figure 6:
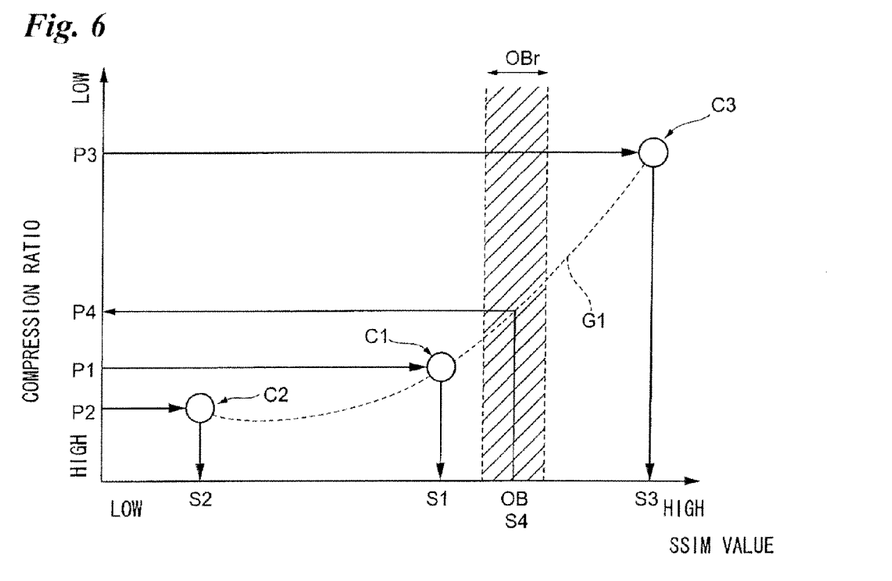

FIG. 6 is an example of the generated quadratic curve, which is represented by G1.

Let C1 represent the point of intersection between the given compression ratio P1 and the SSIM value S1 obtained when compression based upon JPEG 2000 was applied to the TIFF image at the given compression ratio P1 as mentioned above (see FIG. 5). Further, let P2 represent the best compression ratio (a compression ratio for which the amount of data after compression is smallest within a prescribed range), let S2 represent an SSIM value obtained when compression based upon JPEG 2000 has been performed using the compression ratio P2, and let C2 represent the point of intersection between the compression ratio P2 and the SSIM value S2. Furthermore, let P3 represent the worst compression ratio (a compression ratio for which the amount of data after compression is largest within a prescribed range), let S3 represent an SSIM value obtained when compression based upon JPEG 2000 has been performed using the compression ratio P3, and let C3 represent the point of intersection between the compression ratio P3 and the SSIM value S3. The quadratic curve G1, which passes through the three intersections C1, C2 and C3 thus obtained, is generated. This quadratic curve G1 is assumed to define the relationship between compression ratio and SSIM value.

When the quadratic curve G1 is generated, a compression ratio to be designated next is calculated (step 27 in FIG. 4).

Figure 7:
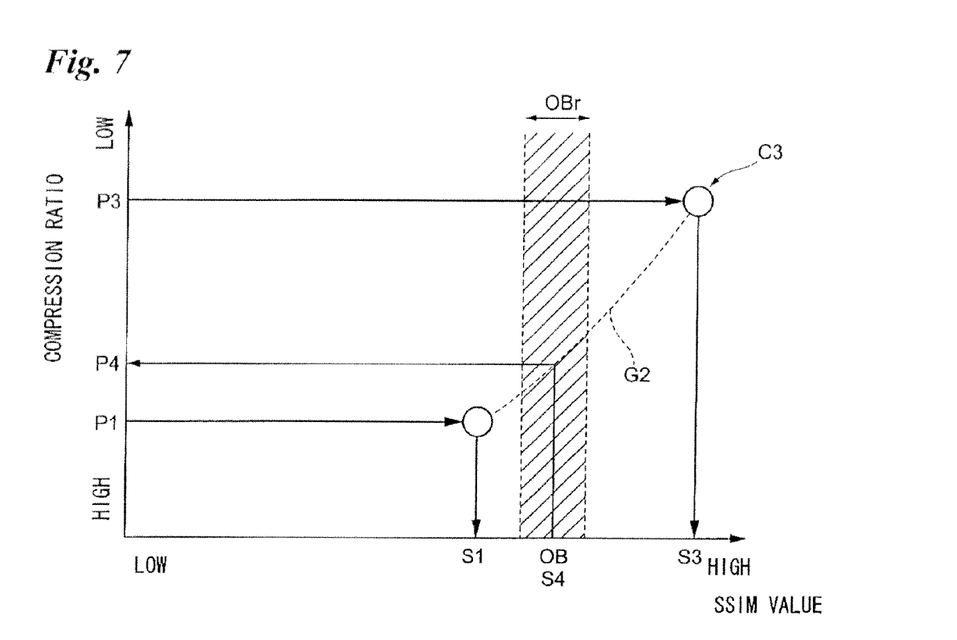

In FIG. 6, a compression ratio P4, which corresponds to the point of intersection between an SSIM value S4 equal to the target SSIM value OB and the generated quadratic curve G1, is calculated and the calculated compression ratio P4 is adopted as the compression ratio designated next. Now, as shown in FIG. 7, if the compression ratio P4 is smaller than the immediately preceding compression ratio P1 obtained by actual measurement (i.e., if P4<P1 holds), then the best compression ratio is updated to P1. Conversely, if the compression ratio P4 is greater than the immediately preceding compression ratio P1 obtained by actual measurement (i.e., if P4>P1 holds), then the worst compression ratio is updated to the immediately preceding compression ratio P1. Here it is assumed that a quadratic curve G2 for which the best compression ratio has been updated is obtained.

Compression based upon JPEG 2000 is applied to the TIFF image using the calculated compression ratio P4 (step 28 in FIG. 4). The compressed image is decoded (step 29 in FIG. 4) and the SSIM value is calculated (step 30 in FIG. 4).

Figure 8:
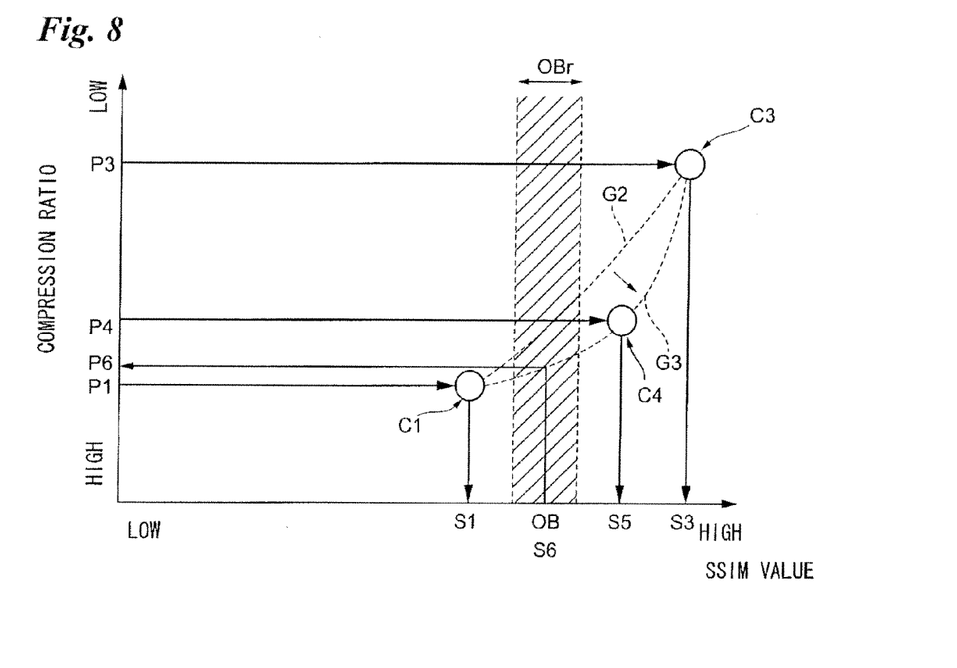

With reference now to FIG. 8, assume that the SSIM value of the image compressed using the calculated compression ratio P4 is S5. If the SSIM value S5 is not within the allowable range ("NO" at step 25 in FIG. 4), then the quadratic curve G2 is corrected so as to pass through a point of intersection C4 between the compression ratio P4 and the SSIM value S5 (step 26 in FIG. 4). A corrected quadratic curve G3 is obtained.

Figure 9:
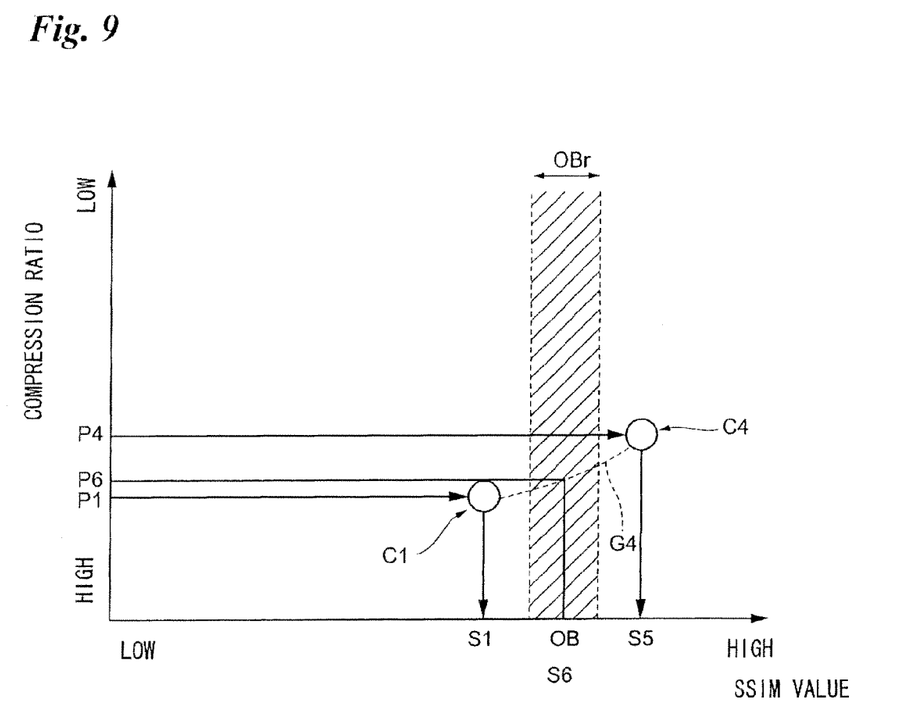

With reference to FIG. 8, a compression ratio P6, which corresponds to the point of intersection between an SSIM value S6 equal to the target SSIM value GB and the corrected quadratic curve G3, is calculated and the calculated compression ratio P6 is adopted as the compression ratio designated next, in a manner similar to that described above. If, as in a manner similar to that described above, at this time the compression ratio P6 is smaller than the immediately preceding compression ratio P4 obtained by actual measurement (i.e., if P6<P4 holds), then the best compression ratio is updated to P4. Conversely, as shown in FIG. 9, if the compression ratio P6 is greater than the immediately preceding compression ratio P4 obtained by actual measurement (i.e., if P6>P4 holds), then the worst compression ratio is updated to the immediately preceding compression ratio P4. Here it is assumed that a quadratic curve G4 for which the worst compression ratio has been updated is obtained.

Compression based upon JPEG 2000 is applied to the TIFF image using the calculated compression ratio P6 (step 28 in FIG. 4). The compressed image is decoded (step 29 in FIG. 4) and the SSIM value calculated (step 30 in FIG. 4).

Figure 10A:
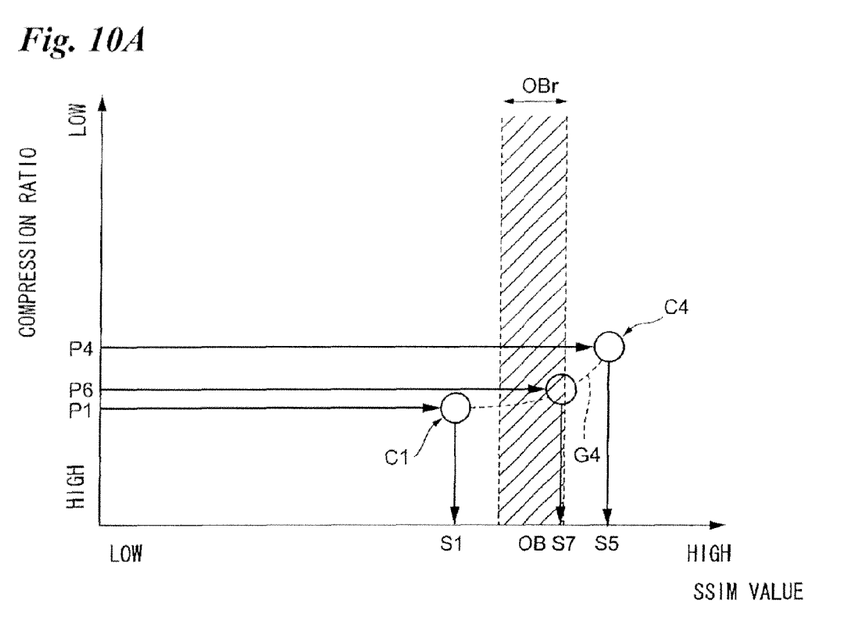
FIGS. 10A and 10B illustrate the relationship between compression ratio and image degradation index value.

With reference to FIG. 10A, assume that the SSIM value of the image compressed using the calculated compression ratio P6 is S7. If the SSIM value S7 is within the allowable range ("YES" at step 25 in FIG. 4), then, as described above, the compression ratio P6 that prevailed when the SSIM value S7 was obtained is stored in order to be utilized as the initial compression ratio of the next image, and the compressed image is output (steps 31, 32 in FIG. 4).

Figure 10B:
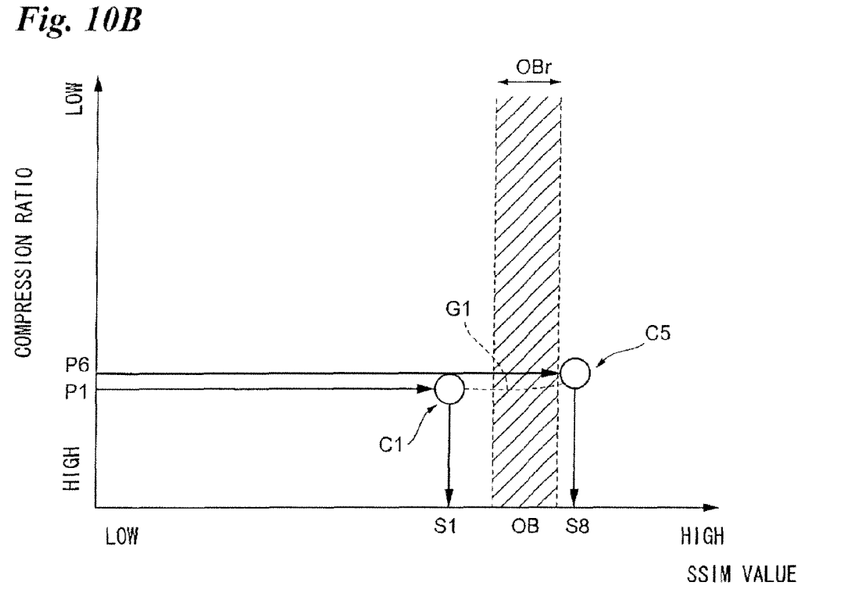

With reference to FIG. 10B, assume that the SSIM value of the image compressed using the calculated compression ratio P6 is S8. If the SSIM value S8 is not within the allowable range ("NO" at step 25 in FIG. 4), then the above-described processing is repeated until the quadratic curve G4 is corrected to a quadratic curve G5 that passes through a point of intersection C5 between the compression ratio P6 and the SSIM value S8 and the SSIM value falls within the allowable range.

In the embodiment set forth above, a quadratic curve is used but the curve is not limited to a quadratic curve and a compression ratio to be designated can also be calculated utilizing a logarithmic curve or the like. Further, although the first quadratic curve is generated utilizing an initial compression ratio in the foregoing embodiment, an arrangement may be adopted in which a quadratic curve is generated in advance, a compression ratio is calculated using this quadratic curve and the quadratic curve is corrected.

As many apparently widely different embodiments of the present invention can be made without departing from the spirit and scope thereof, it is to be understood that the invention is not limited to the specific embodiments thereof except as defined in the appended claims.

What is claimed is:

1. An irreversible compression apparatus for irreversibly compressing image data, comprising:
    an irreversible compression control device for controlling the irreversible compression apparatus, based upon a curve representing a relationship between compression ratio of irreversible compression and image quality of image data that has been irreversibly compressed, in such a manner that the image will be irreversibly compressed at a compression ratio that will result in a desired image quality;
    an image quality calculating device for calculating the image quality of the image data irreversibly compressed under control exercised by said irreversible compression control device;
    a curve correcting device for correcting the curve so as to satisfy a relationship between the compression ratio, which is used in control of the irreversible compression apparatus by said irreversible compression control device, and the image quality calculated by said image quality calculating device; and
    a control device for controlling said irreversible compression control device, said image quality calculating device and said curve correcting device in such a manner that control by said irreversible compression control device, calculation of image quality by said image quality calculating device and correction of the curve by said curve correcting device are repeated until the image quality calculated by said image quality calculating device attains the desired image quality.

2. The apparatus according to claim 1, further comprising a curve generating device for generating said curve from a relationship between image quality of image data obtained when image data has been irreversibly compressed at a desired initial compression ratio, and the initial compression ratio;
    wherein the irreversible compression control device controls the irreversible compression apparatus, based upon the curve generated by said curve generating device, in such a manner that the image data will be irreversibly compressed at a compression ratio that will result in the desired image quality.

3. The apparatus according to claim 2, wherein said curve generating device generates said curve from:
    the relationship between image quality of image data obtained when image data has been irreversibly compressed at a desired initial compression ratio, and the initial compression ratio;
    a relationship between best image quality of image data after irreversible compression and a compression ratio obtained at the time of the best image quality; and
    a relationship between worst image quality of image data after irreversible compression and a compression ratio obtained at the time of the worst image quality.

4. The apparatus according to claim 1, wherein said image quality calculating device includes a decoding device for decoding image data that has been irreversibly compressed under control exercised by said irreversible compression control device; and
    image quality is calculated by comparing the image data decoded by said decoding device and image data prior to irreversible compression by said irreversible compression apparatus.

5. The apparatus according to claim 1, wherein said curve correcting device corrects the curve so that a range of a maximum and a minimum becomes small.

6. The apparatus according to claim 1, wherein the curve comprises a logarithmic curve.

7. The apparatus according to claim 1, wherein said curve correcting device corrects the curve so that a range of a maximum and a minimum is within a predetermined range.

8. The apparatus according to claim 1, wherein the curve comprises a quadratic curve.

9. The apparatus according to claim 1, wherein the curve is generated in advance, the compression ratio is calculated using said curve generated in advance, and
    wherein the curve correcting device corrects the curve generated in advance.

10. The apparatus according to claim 1, wherein the curve comprises a quadratic curve generated in advance, the compression ratio is calculated using said quadratic curve and the curve correcting device corrects the quadratic curve.

11. The apparatus according to claim 1, wherein said control device changes said range quality without changing said compression ratio.

12. A method of controlling operation of an irreversible compression apparatus for irreversibly compressing image data, comprising:
    an irreversible compression control device controlling the irreversible compression apparatus, based upon a curve representing a relationship between compression ratio of irreversible compression and image quality of image data that has been irreversibly compressed, in such a manner that the image will be irreversibly compressed at a compression ratio that will result in a desired image quality;
    an image quality calculating device calculating the image quality of the image data irreversibly compressed under control exercised by the irreversible compression control device;
    a curve correcting device correcting the curve so as to satisfy a relationship between the compression ratio, which is used in control of the irreversible compression apparatus by the irreversible compression control device, and the image quality calculated by the image quality calculating device; and a control device controlling the irreversible compression control device, the image quality calculating device and the curve correcting device in such a manner that control by the irreversible compression control device, calculation of image quality by the image quality calculating device and correction of the curve by the curve correcting device are repeated until the image quality calculated by the image quality calculating device attains the desired image quality.

13. The method according to claim 12, wherein said curve correcting device corrects the curve so that a range of a maximum and a minimum becomes small.

14. The method according to claim 12, wherein the curve comprises a logarithmic curve.

15. The method according to claim 12, wherein said curve correcting device corrects the curve so that a range of a maximum and a minimum is within a predetermined range.

16. The method according to claim 12, wherein the curve comprises a quadratic curve.

17. The method according to claim 12, wherein the curve is generated in advance, the compression ratio is calculated using said curve generated in advance, and wherein the curve correcting device corrects the curve generated in advance.

18. The method according to claim 12, wherein the curve comprises a quadratic curve generated in advance, the compression ratio is calculated using said quadratic curve and the curve correcting device corrects the quadratic curve.

19. A non-transitory computer readable storage medium for storing a computer-readable program for controlling a computer of an irreversible compression apparatus for irreversibly compressing image data, so as to:

control the irreversible compression apparatus, based upon a curve representing a relationship between compression ratio of irreversible compression and image quality of image data that has been irreversibly compressed, in such a manner that the image will be irreversibly compressed at a compression ratio that will result in a desired image quality;

calculate the image quality of the irreversibly compressed image data;

correct the curve so as to satisfy a relationship between the compression ratio, which is used in control of the irreversible compression apparatus, and the calculated image quality; and repeat control of the irreversible compression processing, calculation of image quality and correction of the curve until the calculated image quality attains the desired image quality.

* * * * *